US005556173A

United States Patent [19]

Steiner et al.

[11] Patent Number: 5,556,173
[45] Date of Patent: Sep. 17, 1996

[54] DEVICE AND METHOD FOR TERMINATION AN AUTOMATIC BRAKING PROCESS IN MOTOR VEHICLES

[75] Inventors: Manfred Steiner, Winnenden; Christoph Steffi, Blaufelden, both of Germany

[73] Assignee: Mercedes-Benz AG, Germany

[21] Appl. No.: 337,443

[22] Filed: Nov. 8, 1994

[30] Foreign Application Priority Data

Nov. 8, 1993 [DE] Germany ................... 43 38 070.0

[51] Int. Cl.⁶ .................................................. B60T 13/74
[52] U.S. Cl. ........................ 303/3; 303/20; 303/113.4
[58] Field of Search ............................ 303/113.4, 114.1, 303/3, 15, 20

[56] References Cited

U.S. PATENT DOCUMENTS

| | | | |
|---|---|---|---|
| 4,418,963 | 12/1983 | Sprockhoff | 303/3 |
| 4,978,177 | 12/1990 | Ingraham et al. | 303/3 |
| 5,217,280 | 6/1993 | Nykerk et al. | 303/3 |

FOREIGN PATENT DOCUMENTS

| | | |
|---|---|---|
| 2230830 | 10/1990 | United Kingdom . |
| 2252373 | 8/1992 | United Kingdom . |

*Primary Examiner*—Lee W. Young
*Attorney, Agent, or Firm*—Evenson, McKeown, Edwards & Lenahan, P.L.L.C.

[57] ABSTRACT

A device and method for terminating an automatic braking process in a motor vehicle ensures that the automatic braking process is reliably switched off. The relative movement between the pressure rod of the brake system and a component which can be moved with respect thereto within a defined movement play is detected by two control switches, namely a make contact and a break contact which are actuated via a common switching cam. A switching process of the control switches takes place whenever the brake pedal is moved in the direction of its rest position. If a switching process which corresponds to this relative movement takes place during an automatic braking process, the braking process is terminated.

11 Claims, 2 Drawing Sheets

DEVICE AND METHOD FOR TERMINATION AN AUTOMATIC BRAKING PROCESS IN MOTOR VEHICLES

CROSS-REFERENCE TO RELATED APPLICATION

This application is related to application Ser. No. 08/377,426 filed on Nov. 8, 1994 in the name of Manfred Franz BRUGGER et al. for MONITORING METHOD AND DEVICE IN AUTOMATIC BRAKING PROCESS; to application Ser. No. 08/337,429 filed on Nov. 8, 1994, in the name of Siegfried RUMP et al. for METHOD FOR CONTROLLING THE TRIGGERING SENSITIVITY OF A VEHICLE AUTOMATIC BRAKING PROCESS TO MATCH DRIVER BEHAVIOR; to application Ser. No. 08/337,427 filed on Nov. 8, 1994 in the name of Siegfried RUMP et al. for METHOD FOR AUTOMATIC BRAKING OF MOTOR VEHICLES WITH AN ANTI-LOCK BRAKE SYSTEM; to application Ser. No. 08/337,425 filed on Nov. 8, 1994 in the name of Manfred STEINER et al. for METHOD FOR TERMINATING A MOTOR VEHICLE AUTOMATIC BRAKING PROCESS; and to application Ser. No. 08/337,432 filed on Nov. 8, 1994 in the name of Manfred STEINER for METHOD OF CONTROLLING SENSITIVITY OF VEHICLE AUTOMATIC BRAKING PROCESS.

BACKGROUND AND SUMMARY OF THE INVENTION

The present invention relates to a device and method for terminating an automatic braking process in a motor vehicle and, more particularly, to a device for terminating in a motor vehicle, an automatic braking process which has been triggered by a control unit as a function of brake pedal actuation and which is terminated when a breaking-off criterion is fulfilled, the vehicle having a brake system in which a brake pedal force is transmitted via a pressure rod to a brake booster.

DE 40 28 290 C1 describes an automatic braking process which is triggered when a specific actuation speed of the brake pedal is exceeded and is terminated at least when the driver no longer acts on the brake pedal. Further criteria for initiating and terminating such an automatic braking process are illustrated in non-prepublished Patent Application DE-P. 43 25 940.5 where it is also proposed to detect the pedal force applied to the brake pedal by the driver and to terminate the automatic braking process as a function of this pedal force.

The detection of the pedal force in the brake pedal requires additional sensor and evaluation logic, which, particularly with a component which is safety critical, requires an additional design and development outlay.

An object of the present invention is to provide a device and method which ensures reliable switching off of the automatic braking process but only with a low additional outlay.

The foregoing object has been achieved in accordance with the present invention by detecting the relative movement between the pressure rod of the brake system and a component which can be moved with respect thereto within a defined movement play. The detection of the relative movement of the component with respect to the pressure rod takes place by two control switches, i.e. a make contact and a break contact, which are actuated via a common switching cam. A switching process of the control switches takes place whenever the brake pedal is moved in the direction of its rest position. If a switching process which corresponds to this relative movement takes place during an automatic braking process the braking process is terminated.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
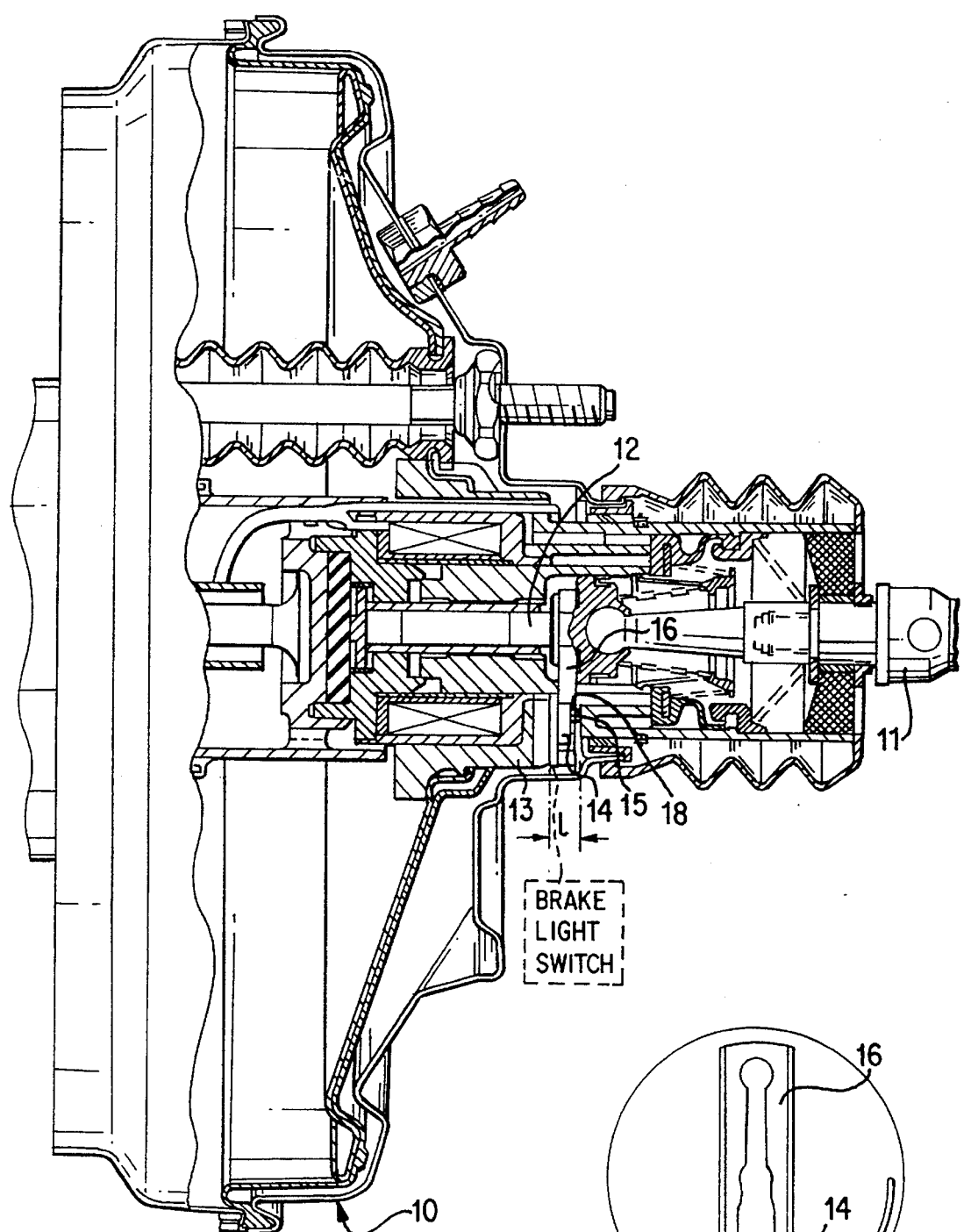
FIG. 1 is a partial cross-sectional through a brake booster with switching element arranged therein in accordance with the present invention.
Figure 1A:
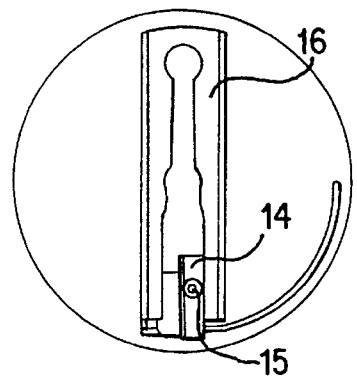

A brake booster designated generally by numeral 10 is shown in its rest position in FIG. 1. A switching cam 15 of switching element 14 arranged on a bolt 16 is also in the rest position. If the brake pedal (not shown) is actuated, first the valve piston 12 is moved by the pressure rod 11 in the direction of the main brake cylinder 19. Then, after the switching path of the valve piston 12 in the control housing 13 is overcome, both the valve piston 12 and the control housing 13 are moved in the main brake cylinder direction. During this movement, the switching cam 15 is also not actuated, because the bolt 16 is moved away during this movement from the front stop 18 which serves as an actuation element. The valve piston 12 does not move in the control housing 13 sufficiently far to the rear for the bolt 16 to reach the front stop 18 until the brake pedal is released and quickly moved in the direction of its rest position. Then, the switching cam 15 is actuated by the front stop 18. With the switching element 14 functioning normally, a switching process takes place. In cases in which an automatic braking process is carried out, the breaking-off criterion of the automatic braking process is then fulfilled and it is terminated.

However, since the switching process also takes place in the case of actuation of the brake pedal in which an automatic braking process is not triggered, the function of the switching-off criterion can be continuously monitored. As soon as the braking process is terminated and a pressure compensation has taken place between the chambers of the brake booster 10, the valve piston 12 moves in the control housing 13 into its rest position again. The bolt 16 then no longer lies against the front stop 18, the switching cam 15 is no longer acted on and the switching element 15 is, also in the rest position, provided normal functioning is taking place.

Figure 2:
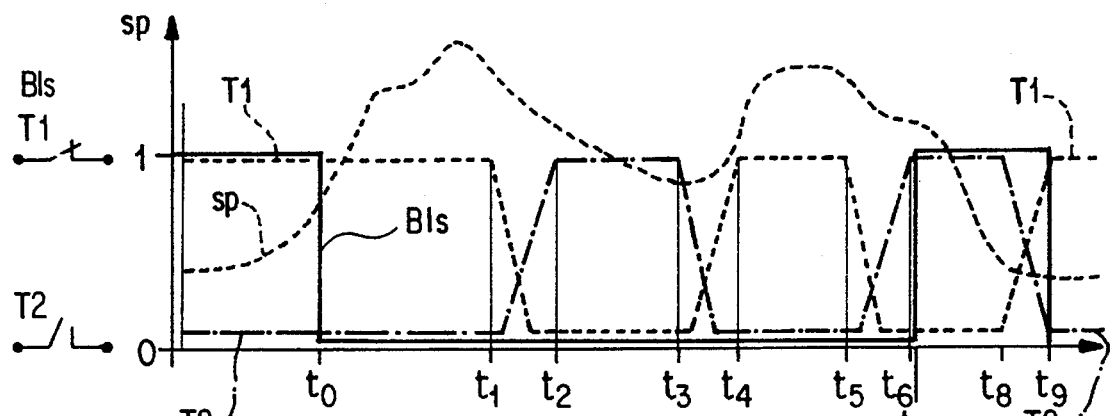
FIG. 2 is a graph showing the switching positions of the control switches and a brake light switch via a braking process.

FIG. 2 shows the signal timing characteristic at binary inputs of a control unit which is fed the signals of two control switches and of a brake light switch. A signal "1" corresponds to a closed circuit and a signal "0" corresponds to a broken circuit. The pedal travel sP realized by the brake pedal has been superimposed on the graph with synchronous timing. The pedal travel curve sP is shown by a dotted line. The signal characteristic of the brake light switch Bls is represented as solid line. The signal characteristic T1 of the control switch which is realized as a break contact represented by a heavier broken line. The signal characteristic T2 of the control switch which is a maker contact is represented by a dot-dash line.

At the time t0, the brake pedal is moved out of its rest position to the extent that the brake light switch is actuated. Before this time, both control switches must be in a rest position. Since the brake light switch is usually realized as a break contact, the signal Bls of the brake light switch switches from "1" to "0" at the time t0.

At the time t1, when the brake pedal is retracted by the driver, the control switch used as a break contact switches. At the time t2, the switching process of the other control switch which is used as a break contact is terminated. As a result, provided an automatic braking process is taking place, the breaking-off criterion is fulfilled and the braking process is terminated. A time interval between the times t2 and t1 which is greater than a threshold value St1 which has the value of a low number of working cycles of the control device permits it to be concluded that there is a fault in the switching device. Here, one working cycle of the control device last approximately 10 ms, a low number of working cycles is for example a maximum up to five working cycles of 10 ms each (preferably, however, only two working cycles).

If a fault is detected, the triggering of an automatic braking processing is prevented. The failure of the automatic braking process is indicated via a display or a monitoring lamp and the driver is requested to go to a garage. If the fault occurs at the end of the automatic braking process, that process is preferably not terminated until the breaking-off criterion is detected. The failure is not indicated until the automatic braking process is terminated or even not until after the brake light switch indicates the termination of the braking process.

During the further chronological sequence, the brake pedal is depressed again more strongly by the driver, and the peal travel increases again. Providing the system is operating correctly, the control switches switch between the times t3 and t4 and assume the rest position. When the brake is released again, a further switching process takes place between the times t5 and t6 since the control switches are actuated again. At the time t7, the brake light switch closes since the pedal travel has become so small that it is no longer actuated. However, the switching back of the switching element only takes place between the times t8 and t9. Even in the case of these switching processes of the switching element, the time intervals between the switching of one control switch and the switching of the other control switch must not exceed the prescribed limit. In addition, the time interval prescribed by the switching times t7 (switching process of the brake light switch Bls from "0" to "1") and t9 (termination of the switching process of the last control switch to switch) must also not exceed a prescribed limit value St2 which lies in the region of a low number of the control device working cycles, for example up to 15. The limit value St2 here should lie above the time period during which the valve piston is moved in the control housing out of the rest position and into the switched position in which a pressure compensation takes place between the chambers of the pressure vacuum brake booster with simultaneous evacuation for example via the manifold.

According to one embodiment of the present invention, analog signals, or digital signals produced from analog signals by analog-to-digital conversion, are fed to the control unit. This feed not only permits a fault to be discovered but also permits the type of fault to be determined. For this purpose, a test circuit can be used, for example for each control switch. The test circuit consists of a resistor which is connected in series with the control switch. A resistor is connected in parallel to the series circuit consisting of the resistor and control switch. A further resistor is connected in series with this parallel circuit. This resistor is connected to a voltage source. The parallel circuit is connected to ground. The voltage to the resistor which is in series with the parallel circuit is detected as a signal. Preferably, all the resistors have the same impedance R. If the voltage source supplies the voltage U, the voltage signal has the value U/2 when the control switch is opened and the value U/3 when the switch is closed. A voltage signal "1" indicates a break in the cable downstream of the measuring point and a voltage signal "0" indicates a break in the cable upstream of the measuring point. Conclusions as to the operation of the control switch are made by reference to the occurrence or non-occurrence of switching processes.

Figure 3:
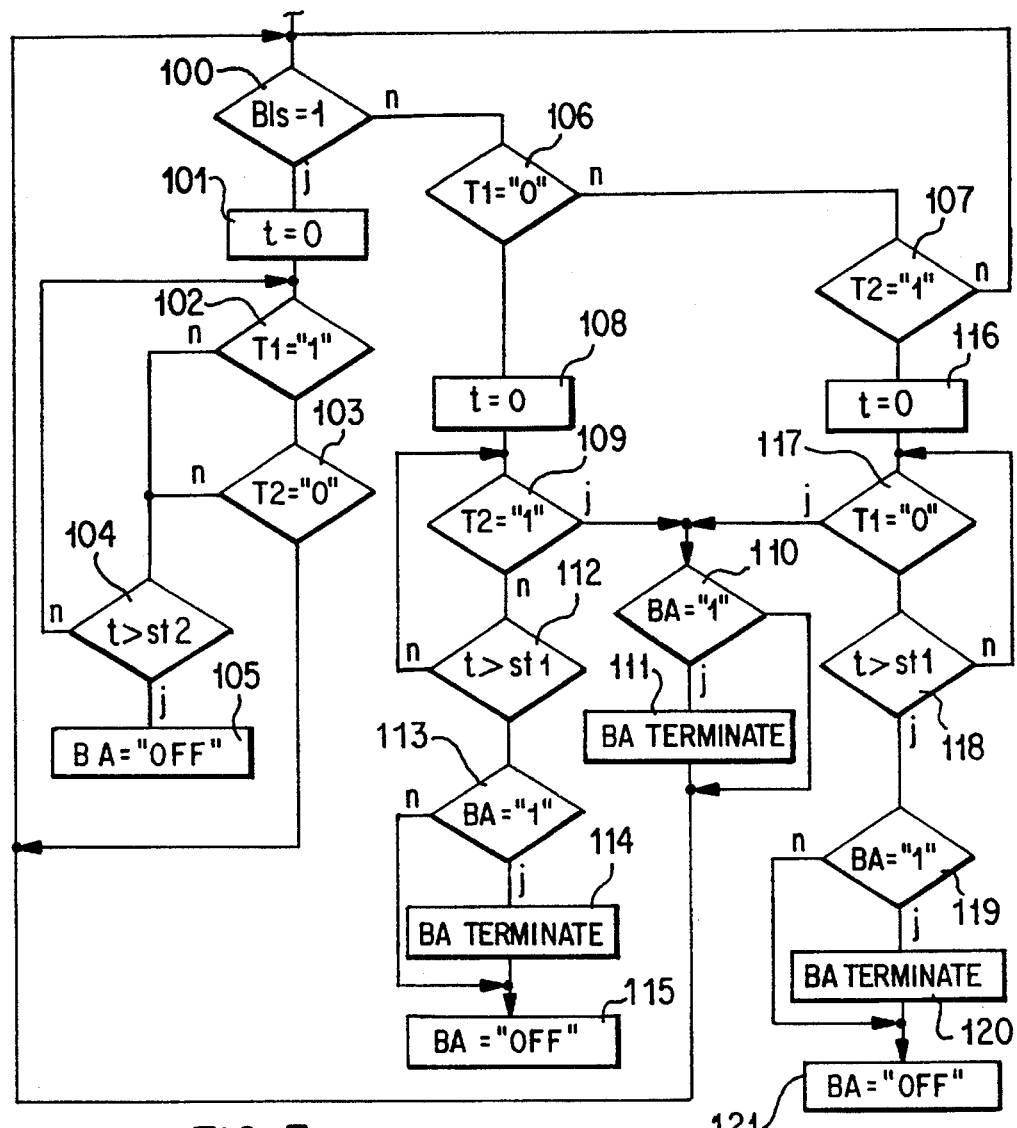
FIG. 3 is a flow diagram showing the sequence of the functional monitoring of the switching device.

The operational monitoring of the switching device described in FIG. 1 is shown in FIG. 3 and takes place in parallel with the control of the automatic braking process and has two interfaces thereto. According to the first interface in the steps 114 and 120, the automatic braking process is terminated since, during the operational monitoring, it is detected that the breaking-off criterion of the automatic braking process has been fulfilled. The termination of the automatic braking process can be performed by the control of the automatic braking process after an approximate signal has been transmitted from the operational monitoring system of the deactivator to the control of the automatic braking process. After the automatic braking process is terminated, a signal is then transmitted to the operational monitoring to cause the operational monitoring to carry on to the next step.

The second interface is made of the steps 105, 115 and 121 which are reached when the operational monitoring system detects an operational fault in deactivation. Then, triggering of the automatic braking process must be terminated. For this purpose also, an appropriate signal to the control of the automatic braking process can take place, and the control itself then prevents triggering of the automatic braking process. For the sake of safety, the deactivation of the automatic braking process can take place such that it lasts until the appropriate signal has been reset in a visit to a garage.

For example, a signal representing measured pedal travel can be supplied to the control unit. The control unit concludes an absence of a fault in deactivating the automatic braking process if the control switches do not switch when the pedal travel is smaller than, say 50 mm and also the pedal speed is smaller than a pedal speed threshold value of, say between 100 mm/s and 200 mm/s.

In step 100, it is tested whether the brake light switch Bls which is constructed as a break contact is closed, that is to say the signal "1" is produced. If this is the case, in step 101 a variable t which represents the time is reset to the value 0. In the steps 102 and 103 it is tested whether the control switches T1 and T2 are in their position of rest, that is to say whether the signals T1="1" and T2="0" are transmitted to the control unit. If this is the case, no operational fault of the deactivation can be detected and the system jumps back to the start of the program. If it is detected in one of the two steps 102 or 103 that the signal corresponding to the position of rest of the control switch is not transmitted to the control device, .t is tested whether or not the time threshold value St2 has passed since the resetting of the variable t. If the time threshold value St2 has not been exceeded, the system jumps back to step 102. If, on the other hand, the time threshold value St2 has been exceeded, a fault is deemed present in the deactivation. Accordingly, in step 105, the triggering of the automatic braking process is then prevented and a corresponding item of information is made available to the driver.

If, on the other hand, it is detected in step 100 that the brake light switch is actuated, and therefore the signal Bls="0" is transmitted to the control, it is initially tested in step 106 whether the control switch T1 which is realized as a break contact is actuated and thus the signal TI="0" is transmitted to the control unit. If this is not the case, it is tested in step 107 whether the control switch T2 which is used as a maker contact is actuated and thus the signal T2="1" is transmitted to the control unit. If this is also not the case, the system jumps back to step 100.

If it is detected in one of the two steps 106 or 107 that the corresponding control switch T1 or T2 is actuated, the variable t is reset to 0 in the step 108 or 116. In the step 109 or in the step 117, it is then tested whether the other control switch T2 or T1 is also actuated. If this is the case, it is tested in step 110 whether an automatic braking process is taking place or not. If an automatic braking process is occurring, according to step 111, it is transmitted to the control of the automatic braking process that the breaking-off criterion is fulfilled and the automatic braking process is then terminated. Subsequently, the operational monitoring jumps back to step 100 which is also done if it has been detected in step 110 that an automatic braking process is not taking place.

If it has been detected in step 109 or 117 that the second control switch T2 or T1 is not actuated, it is then tested in steps 112 or 118 whether or not the time threshold St1 is exceeded by the time variable t. If the time threshold St1 is not exceeded, a jump back to step 109 or 117 takes place. If, however, it is detected in step 112 or 118 that the time threshold St1 has been exceeded, in step 113 or step 119 it is tested whether an automatic braking process is taking place or not. If an automatic braking process is occurring, according to step 114 or 120, the fulfillment of the breaking-off criteria is transmitted to the control of the automatic braking process. The automatic braking process is then terminated, and subsequently the step 115 or 121 is carried out. The system jumps directly to step 115 or 121 if it is detected in step 113 or 119 that an automatic braking process is not taking place. In step 115 or 121, the triggering of the automatic braking process is prevented and a corresponding item of information is made available to the driver.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A device in a motor vehicle for terminating, upon fulfillment of a breaking-off criteria, an automatic braking process which has been triggered by a control unit as a function of brake pedal actuation, comprising a brake system in which a brake pedal force is transmitted via a pressure rod to a brake booster, a switching device having an actuation element and a switching element, wherein the switching element includes switch means actuatable via a common switching cam actuatable on by the actuation element for providing a make contact and a break contact, one of the actuation and switching elements of the switching device being rigidly connected to the pressure rod, and the other of the actuation and switching elements being arranged on a component movable only with respect to the pressure rod with a a predetermined amount of play, which component carries out, at least with a movement of the brake pedal in a direction of a rest position thereof, a relative movement with respect to the pressure rod within the predetermined amount of play, such that at least the relative movement causes a switching process of the switching element and the switching process is thus used as a breaking-off criterion of the automatic braking process.

2. The device according to claim 1, wherein the switching element is arranged on a control housing of the brake booster and the actuation element is arranged on a valve piston connected to the pressure rod and is longitudinally displaceable in the control housing.

3. The device according to claim 2, wherein a bolt configured to limit travel play of the valve piston in the control housing is the actuation element.

4. The device according to claim 1, wherein signals are fed to a control device whereby the presence of faults in the deactivation of the automatic braking process is concluded, the signals representing at least the switching positions of the switch means and the switching position of a brake light switch.

5. The device according to claim 4, wherein signals representing the switching position of the control switches are digital signals.

6. The device according to claim 4, wherein signals representing the switching position of the control switches are analog signals.

7. The device according to claim 4, wherein the control device is configured to conclude the presence of a fault in the deactivation of the automatic braking process, at least whenever the switching means is not in the rest position, when the brake light switch is in the rest position for longer than a preselected number of working cycles of the control device and the brake light switch is actuated and the timing interval between the switching times of the switch means exceeds the preselected number of working cycles of the control device.

8. The device according to claim 7, further comprising means for supplying a signal representing a measured pedal travel to the control device.

9. The device according to claim 8, wherein the control device is configured to conclude the absence of a fault in deactivation of the automatic braking process if the switch means do not switch when the pedal travel of the brake pedal is smaller than 50 mm and also the pedal speed is smaller than a pedal speed threshold value.

10. The device according to claim 9, wherein the pedal speed threshold value lies between 100 mm/s and 200 mm/s.

11. A method for terminating an automatic braking process comprising the steps of triggering the automatic braking process as a function of brake pedal actuation, transmitting a brake pedal force to a brake booster, effecting a switching process with a make contact switch and a break contact switch, via relative movement with respect to an actuating element arising from a brake pedal movement toward a rest position thereof, such that at least the relative movement causes the switching process which is used as a breaking-off criterion of the automatic braking process, and terminating the automatic braking process when the breaking-off criterion is fulfilled.

\* \* \* \* \*